INVENTORS:
HUMPHREY F. PARKER
and ERFORD E. ROBINS
BY:
Beau, Brooks, Buckley & Beau,
ATTORNEYS.

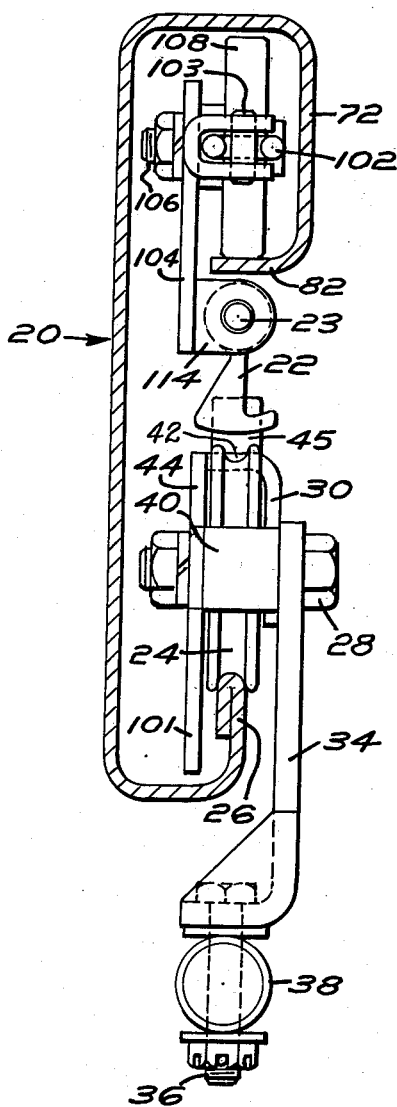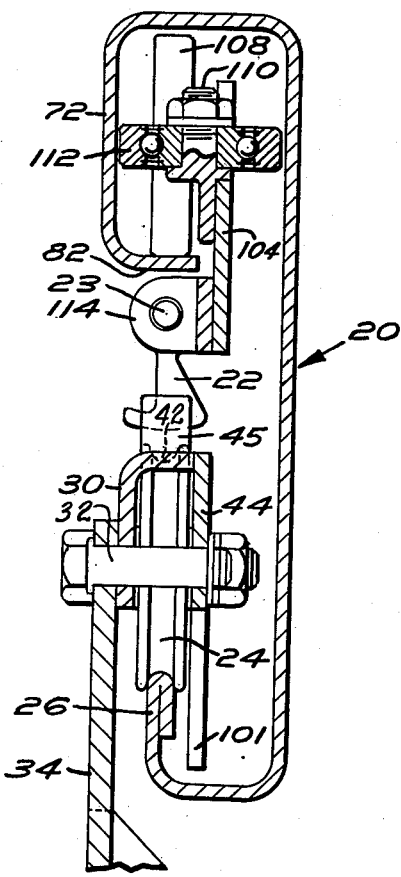

June 25, 1963 H. F. PARKER ET AL 3,094,943
CONVEYOR TROLLEY STABILIZERS
Filed Feb. 16. 1960 4 Sheets-Sheet 4

INVENTORS:
HUMPHREY F. PARKER
and ERFORD E. ROBINS
BY:
Beau, Brooks, Buckley & Beau,
ATTORNEYS.

United States Patent Office
3,094,943
Patented June 25, 1963

3,094,943
CONVEYOR TROLLEY STABILIZERS
Humphrey F. Parker, Buffalo, and Erford E. Robins, North Tonawanda, N.Y., assignors to Columbus McKinnon Corporation, a corporation of New York
Filed Feb. 16, 1960, Ser. No. 8,959
3 Claims. (Cl. 104—172)

This invention relates to trolley conveyor systems, and more particularly to improvements in push trolley carriage devices such as are required in connection with alternately free running and powered trolley conveyor systems.

It is one object of the present invention to provide for alternately powered and free running conveyor systems an improved trolley suspension carriage device.

Another object is to provide an improved carriage as aforesaid which features a cantilever suspension arrangement in combination with an improved anti-derailment safeguard device.

Still another object is to provide a carriage as aforesaid, including improved carriage stabilizing guide wheel arrangements.

Still other objects and advantages of the invention will appear in the specification hereinafter and the accompanying drawing, wherein:

FIG. 3 is a fragmentary section taken along line III—III of FIG. 1;

FIG. 4 is a fragmentary sectional view taken along line IV—IV of FIG. 1;

Figure 1:
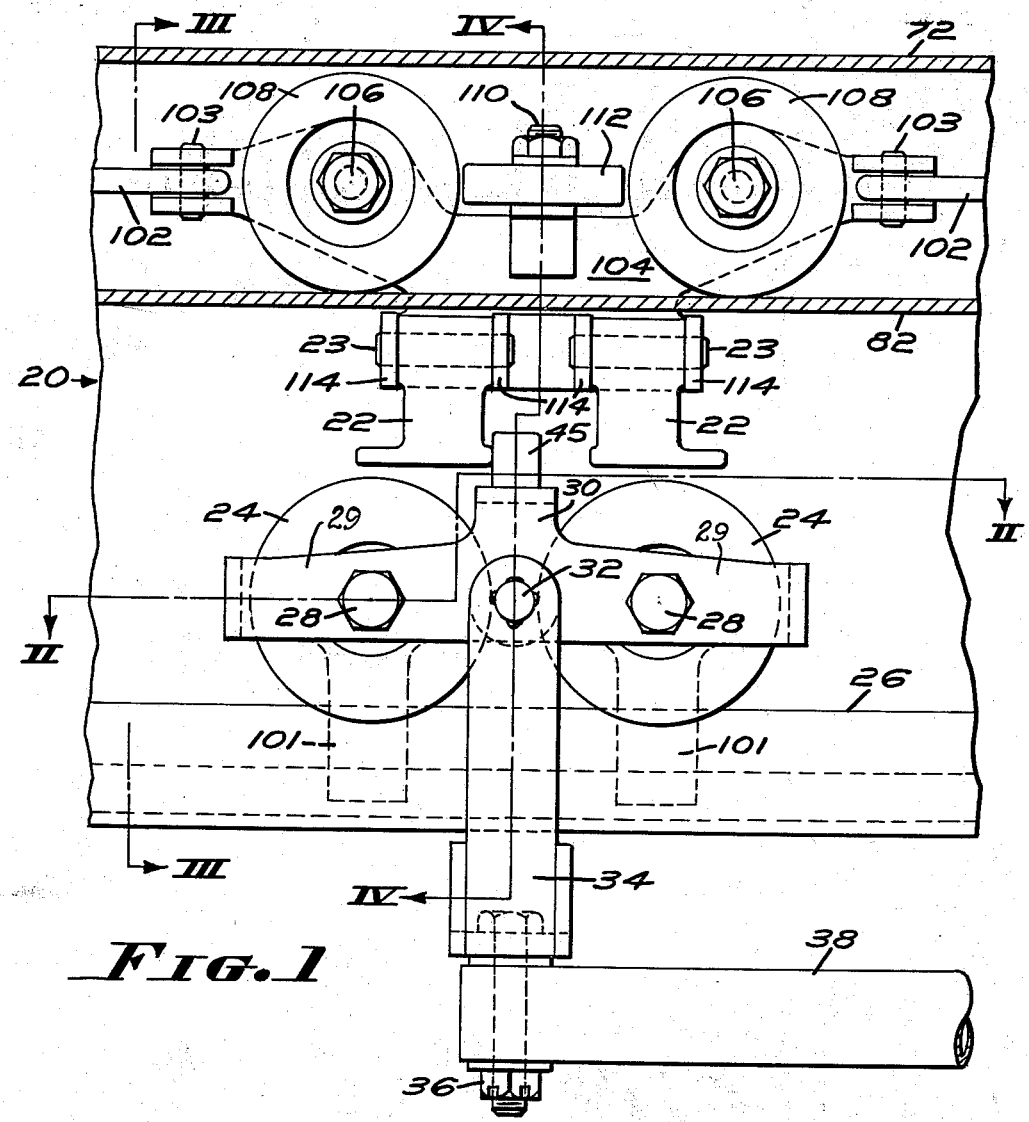
FIG. 1 is a view showing one form of carriage suspension and power chain mounting and guide arrangement.
Figure 2:
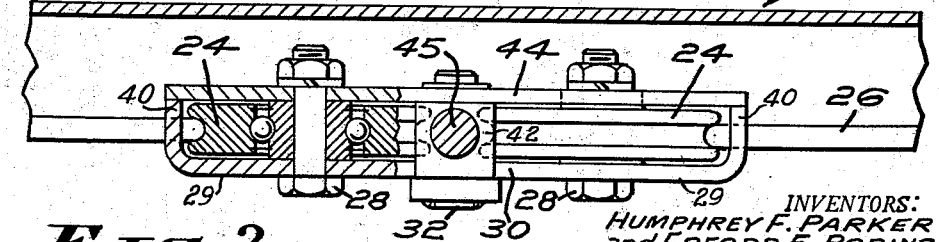
FIG. 2 is a fragmentary section taken along line II—II of FIG. 1.
Figure 5:
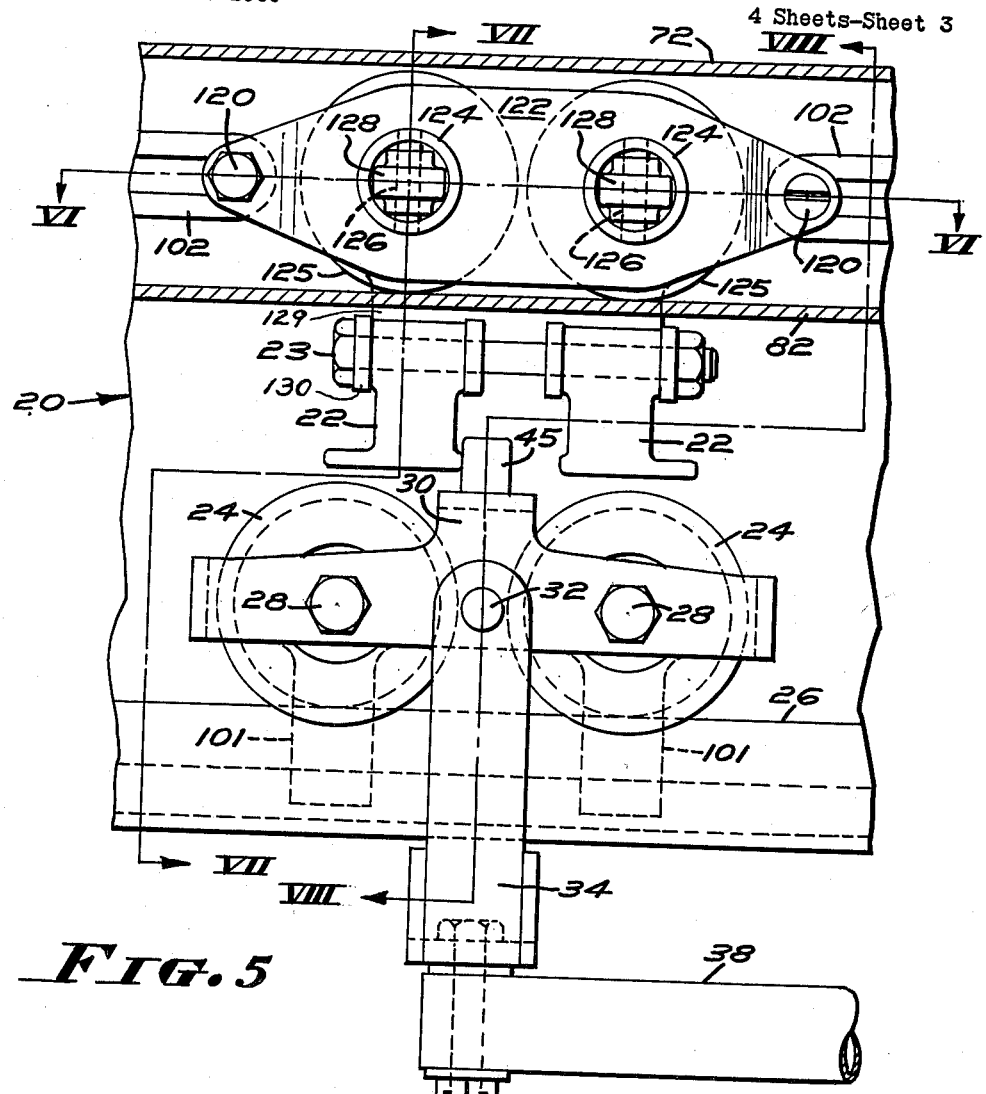
FIG. 5 is a view corresponding to FIG. 1, but showing another form of power chain mounting and guiding and carriage supporting arrangement of the invention.
Figure 6:
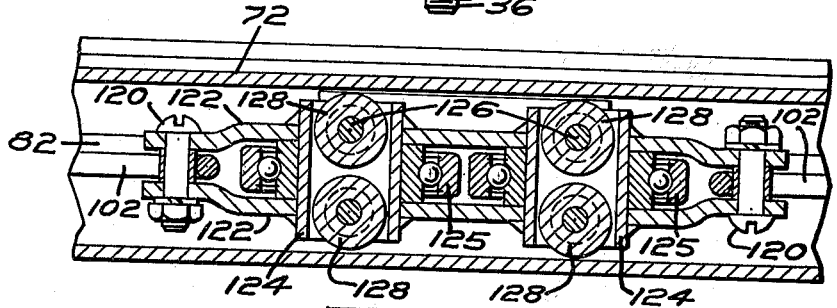
FIG. 6 is a sectional view taken along line VI—VI of FIG. 5.
Figure 7:
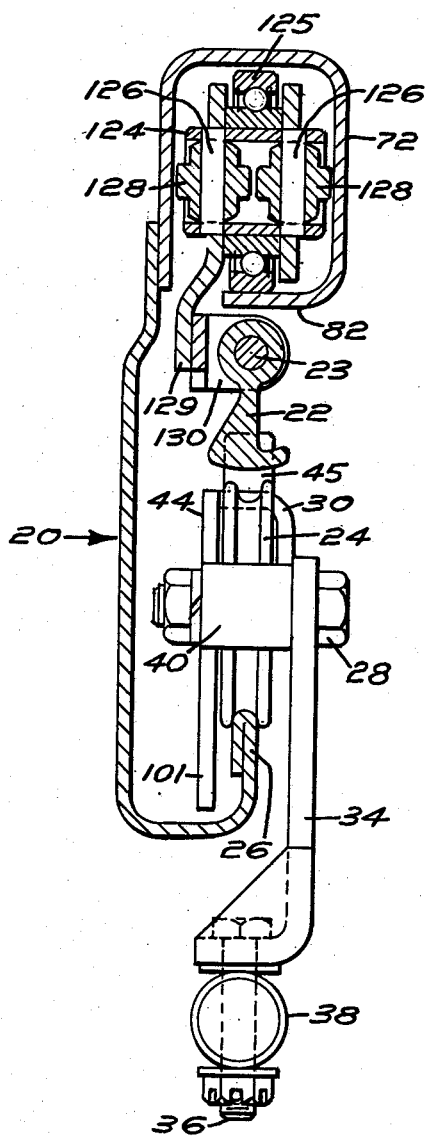
FIG. 7 is a sectional view taken along line VII—VII of FIG. 5.
Figure 8:
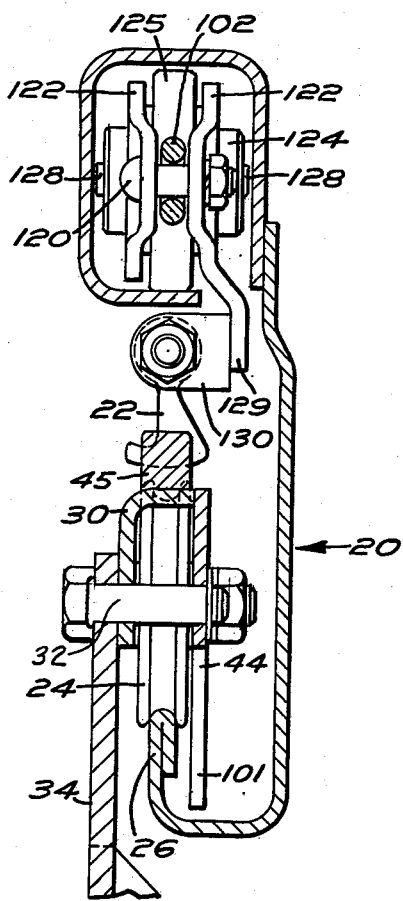
FIG. 8 is a sectional view taken along line VIII—VIII of FIG. 5.

As shown in FIGS. 1-4, the invention is embodied in a conveyor mechanism including a trackway device indicated generally at 20 which is arranged to accommodate along the upper level thereof a power chain or the like having depending pusher dogs as indicated at 22, 22 pivotally supported from the power supply strand, hereinafter described, by means of pins 23; and along the lower level thereof pluralities of trolley carriages. The trolley carriages are shown suspended therefrom by means of paired trolley wheels 24, 24 running on top of an upturned and reverse bent flange or rail portion 26 forming an integral lower portion of the trackway structure 20. The trolley wheels 24 are flanged, thus to roll in guided relation upon the track portion 26, and are mounted by means of axle bolts 28 upon fore-and-aft extending arm portions 29, 29 of a carriage bracket 30. Each bracket 30 in turn supports by means of a bolt 32 a suspension bracket 34 which extends downwardly into connection as indicated at 36 to one end of a carriage rod 38; it being understood that each end of the carriage rod 38 will thus be equipped with a similar suspension arrangement as shown in the drawing herewith, and will thereby be supported in a generally horizontal attitude to receive loads to be hung thereon as by hook devices or the like.

Each trolley support bracket 30 is formed at its opposite ends with inturned tab portions 40—40, and at its top central portion with a horizontally bent tab 42; the tab portions 40—42 being dimensioned to mutually abut a closure plate or pendant arm means 44 which also slip fits upon the bracket bolts 28, 32, thereby completing a boxlike framing structure for the trolley wheels. The upper tab portion 42 includes a vertically extending lug 45 which is thereby disposed in travel alignment with the pusher dogs 22—22 extending downwardly from the power supply chain device.

The leading dog 22 is provided at its front face with a sloping cam surface, not shown, and thus whenever it comes into bearing relation with the trolley lug 45 the dog 22 will cam laterally so as to permit it to move around the trolley lug 45. The concave leading face portion, not shown of the following dog 22 will then come into pushing relation against the trolley lug 45, and the leading dog 22 will then, in response to the forces of gravity thereon, move back into travel direction alignment with the lug 45. Thus, whenever the trolley carriage is disposed in the trackway system as shown in the drawing herewith, and when the power chain travel brings into connection the dogs 22—22 and the lug 45 as explained hereinabove, the power chain will thereupon "pick up" the trolley load carriage and push it forwardly along the trackway system. In event the carriage negotiates a down hill portion of the trackway and the load carriage tends to overrun the power chain, the lug 45 will thereupon move up to bear against the rear concave surface of the leading dog 22 which in this situation will remain in blocking relation against the lug 45. Thus, the trolley carriage will be held back, and will be forced to maintain its proper position in the trolley system.

The present invention features arrangements for stabilizing the trolley carriages relative to the wheel supporting track portion 26, to prevent any unintended displacement therefrom.

The trolley derailment safeguard device is illustrated as comprising downward extensions 101 of the plate or pendant arm means 44, which as shown in FIG. 1 extend below the levels of the bottoms of the wheels 24—24. Thus it will be appreciated that each trolley wheel 24 is safeguarded against derailment by means of a closely associated pendant member 101 which rides close to the upturned flange portion 26 of the trolley rail system.

FIGS. 1-4 also illustrate a pusher carriage in conjunction with the power strand component of the system. The power strand is illustrated at 102—102 (FIG. 1) as being in the form of an interrupted strand of link chain or steel cable, or the like, engaging by means of clevis pins 103—103 to opposite ends of a carriage bracket 104. The bracket 104 mounts a pair of axles 106—106 upon which rotate a pair of wheels 108—108 which ride on the bottom inturned flange portion 82 of the trackway fabrication as explained hereinabove. Centrally thereof the bracket mounts by means of a vertical axle 110 a horizontal guide roller 112 which is thereby disposed to roll interiorly of the trackway and to bear against either of the opposite side walls thereof to counter any tendency of the pusher unit to tilt. At its lower end the bracket 104 is formed with laterally extending ears 114—114 which mount the pins 23 carrying the pusher dogs 22 as explained hereinabove. Thus it will be appreciated that a particularly stable pusher carriage is provided in conjunction with a trolley carriage embodying improved safeguards against accidental derailment.

FIGS. 5-8 inclusive illustrate a modification of the invention wherein the trolley support system is substantially identical to that illustrated and described in connection with FIGS. 1-4 inclusive, but wherein the pusher carriage devices are of somewhat modified form. In this case the power strand is illustrated as comprising strands of chain links 102, interrupted periodically to engage through means of clevis pins 120 with opposed side plates 122, 122. Intermediately of the ends of the side plates 122, 122, cross tubes 124—124 are welded to extend therethrough, and between the plates 122 the tubes 124 mount the inner races of ball bearing rollers 125, 125. Thus, the rims of the rollers 125 are disposed to run upon the trackway flange 82 as explained hereinabove. Interiorly thereof the tubes 124 carry adjacent their opposite ends vertical axle pins 126 upon which are mounted guide rollers 128 which are thereby disposed to roll against the side walls of the trackway. One of the side plates 122 is formed with a downwardly extending tab 129, upon which are mounted the brackets 130 which support the dog carrying pins 23 as explained hereinabove.

Thus, it will be appreciated that the features and advantages of the invention are attained in combination with structural simplifications such as render the mechanisms rugged and foolproof in operation yet inexpensive to manufacture; and that although only a few exemplifications thereof have been illustrated and described in detail, various changes may be made therein without departing from the spirit of the invention or the scope of the following claims.

We claim:
1. A conveyor trolley trackway including a top section of generally box-shaped sectional form and a bottom portion terminating in an upstanding rail portion, a trolley carriage including a support wheel of flanged form straddling the rail portion of said trackway, a load suspension bracket extending downwardly from said carriage alongside the trackway rail portion and thereby providing a derailment safeguard at one side of said rail, pendant arm means extending downwardly from said carriage at the opposite side of said wheel and therebelow to reach inside of said bottom portion of said trackway and alongside the upstanding rail portion of said trackway thereby providing a second derailment safeguard at the opposite side of said rail, a conveyor power strand device disposed within said top section and having guide roller means at intervals thereon running in guiding relation against the inside wall portions of said top section, and interdigitating coupling means interconnecting said carriage and said power strand device.

2. A trolley conveyor device adapted to run in a trackway including an upper portion of generally box-shaped sectional form and a bottom portion terminating in an upstanding rail portion, said conveyor including a trolley carriage carrying a support wheel of flanged form straddling the rail portion of said trackway, a load suspension bracket depending from said carriage downwardly alongside the trackway rail portion and thereby providing a derailment safeguard at one side of said rail, pendant arm means extending downwardly from said carriage at the opposite side of said wheel and therebelow to reach inside of said bottom portion of said trackway and alongside the upstanding rail portion of said trackway thereby providing a second derailment safeguard at the opposite side of said rail, a trolley drive device running in the upper portion of said trackway and comprising a power strand having mounted at intervals therealong a drive unit, each drive unit comprising a bracket journalling thereon about vertical axes paired side roller guide devices and a vertically standing roller encircling said bracket centrally thereof, and interdigitating coupling means interconnecting said carriage and said drive device.

3. A conveyor trolley trackway including a top section of generally box-shaped sectional form and a bottom portion terminating in an upstanding rail portion, a trolley carriage including a support wheel of flanged form straddling the rail portion of said trackway, a load suspension bracket extending downwardly from said carriage alongside the trackway rail portion and thereby providing a derailment safeguard at one side of said rail, pendant arm means extending downwardly from said carriage at the opposite side of said wheel and therebelow to reach inside of said bottom portion of said trackway and alongside the upstanding rail portion of said trackway thereby providing a second derailment safeguard at the opposite side of said rail, and a conveyor power strand device disposed within said top section and comprising a frame plate having a pair of guide roller means at opposite ends thereon running in guiding relation against the inside bottom wall portion of said top section, a horizontally disposed guide roller journalled upon said frame centrally thereof and between said pair of guide rollers and arranged to bear alternately against the opposite side walls of said top section for guiding and stabilizing said strand device, and interdigitating coupling means interconnecting said carriage and said frame.

References Cited in the file of this patent

UNITED STATES PATENTS

| | | |
|---|---|---|
| 581,119 | Hunt | Apr. 20, 1897 |
| 660,082 | Proulx | Oct. 16, 1900 |
| 802,826 | Ryder et al. | Oct. 24, 1905 |
| 854,185 | Traver | May 21, 1907 |
| 1,430,186 | Rasmussen | Sept. 26, 1922 |
| 1,828,603 | Holley | Oct. 20, 1931 |
| 1,867,883 | Haddlesay | July 19, 1932 |
| 2,621,610 | Boyko et al. | Dec. 16, 1952 |
| 2,879,715 | Bohlin | Mar. 31, 1959 |
| 2,883,942 | Johnson | Apr. 28, 1959 |
| 2,947,264 | Parker et al. | Aug. 2, 1960 |

FOREIGN PATENTS

| | | |
|---|---|---|
| 305,834 | Great Britain | Feb. 14, 1929 |
| 786,193 | Great Britain | Nov. 13, 1957 |